United States Patent [19]

Cross

[11] Patent Number: 4,776,629
[45] Date of Patent: Oct. 11, 1988

[54] PICKUP BED COVER

[75] Inventor: Floyd R. Cross, Clifton, Colo.

[73] Assignee: Cross-Country Covers, Inc., Clifton, Colo.

[21] Appl. No.: 106,226

[22] Filed: Oct. 8, 1987

[51] Int. Cl.$^4$ .............................................. B60P 7/02
[52] U.S. Cl. ........................................ 296/100; 160/32
[58] Field of Search ............... 296/100, 216, 219, 220, 296/98, 101; 160/32, 33, 36, 202

[56] References Cited

U.S. PATENT DOCUMENTS

| | | | |
|---|---|---|---|
| 1,826,871 | 10/1931 | Ford | 160/202 X |
| 2,853,340 | 9/1958 | Hershberger | 296/100 X |
| 2,861,836 | 11/1958 | Goeggel | 296/219 |
| 3,649,072 | 3/1972 | Cross | 296/100 |
| 4,611,848 | 9/1986 | Romano | 296/98 |

Primary Examiner—Robert B. Reeves
Assistant Examiner—B. K. Sells
Attorney, Agent, or Firm—Edwin L. Spangler, Jr.

[57] ABSTRACT

This invention relates to an improved telescopable cover for truck beds and the like characterized by a transversely-spaced pair of generally channel-shaped tracks opening toward one another and shaped to define a gutter in the bottom thereof alongside a slot separating upper and lower rail-forming surfaces. Mounted in these rails are a plurality of interlocking slot-forming panels, all but the lead panel of which has a downturned flange along its leading edge, a downwardly and rearwardly sloping cam surface adjacent the trailing edge thereof and an upturned flange along the trailing edge positioned and adapted to lock in behind the downturned flange on the leading edge of the panel therebehind so as to form a chain. A continuation of the lower rail slopes downwardly and forwardly to produce a ramp down which the panels slide and stack atop one another as they leave the confines of the upper rail, become separated and enter a storage area. An upwardly and rearwardly sloping surface above the ramp engages the leading edges of each panel in turn and leaves them in a staggered stack such that the leading edge of each panel is offset to the rear of the corresponding edge of the panel therebeneath. The cam surfaces and upturned flanges on the trailing panel edges define troughs effective to conduct water to the gutters in the tracks where it is discharged onto the ground through suitable drains.

9 Claims, 1 Drawing Sheet

U.S. Patent  Oct. 11, 1988  4,776,629
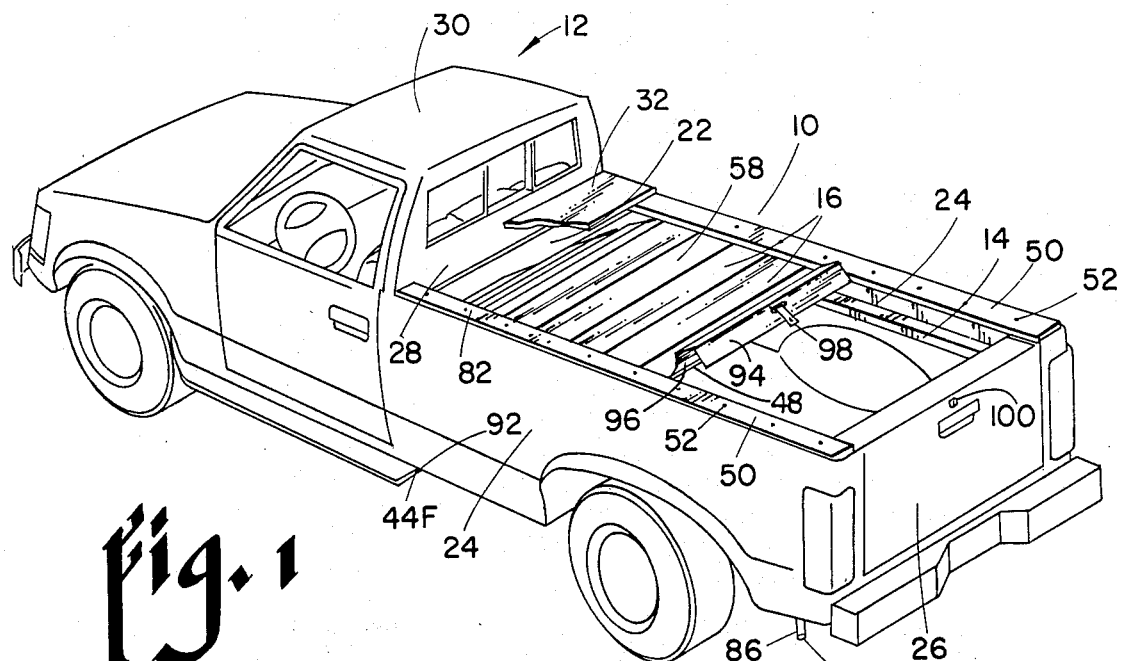
Fig. 1
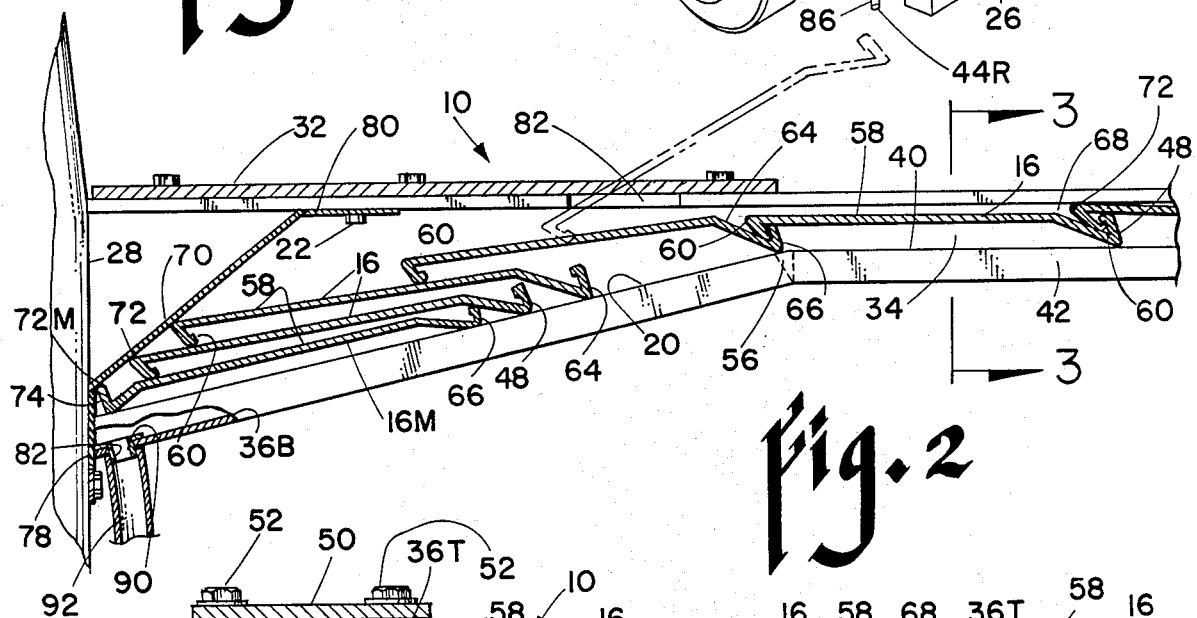
Fig. 2
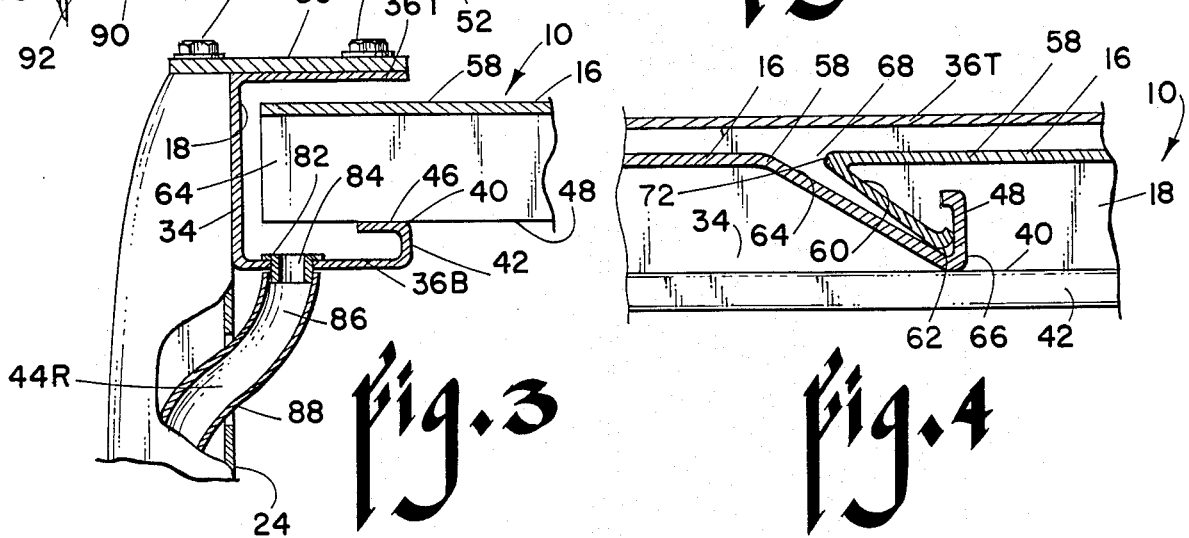
Fig. 3
Fig. 4

PICKUP BED COVER

BACKGROUND OF THE INVENTION

Back in 1972 I obtained a U.S. Pat. No. 3,649,072 on a pickup bed cover comprised of a plurality of individual interlocking slat-forming panels that extended transversely between the upstanding sidewalls of the bed and slid fore and aft within channel-shaped siderails from an extended position covering the bed into a retracted one in which the interlocked slats left the channels, became disconnected from one another and assumed a stacked relation at one end underneath a roofed housing therefor. There were, however, certain shortcomings inherent in the aforementioned construction that I have now been able to either eliminate altogether or at least improve upon significantly.

The first of these was the annoying fact that the cover leaked. While under ordinary circumstances, the joints between the slats were effective to keep water from leaking through onto the load underneath, unfortunately, under heavy weather conditions, even these joints were apt to let some water in. The major problem, however, was the fact the water that shed off to the sides of the cover entered the tracks and from there went on down into the bed since no drainage system was available to get rid of it. Thus, while the cover provided good protection against theft, it was less than effective in terms of keeping the load dry.

An even greater problem surfaced in connection with operation of the cover since the particular way in which the slats stacked one-at-a-time underneath one another caused it to be very difficult to open. More specifically, since each successive panel had to push its way underneath the stack made up of those preceding it, a substantial force had to be applied to the rearmost of the panels at all times and such force as was required became progressively greater as the stack it had to lift became higher.

Finally, as the stack built up, it together with the roofed housing therefor, tended to obscure the vision through the rear window and the occupant's view of the load. While this is by no means a serious drawback, nevertheless, there are occasions where a clear view of the load becomes desirable.

FIELD OF THE INVENTION

The field of the invention is, therefore, that which relates to covers for the beds of pickup trucks and the like made from interlocking slat-forming panels.

DESCRIPTION OF THE RELATED ART

The prior art is replete with doors and roofs which comprise a series of hingedly interconnected slats of one type or another. The U.S. Pat. No. 3,411,560 to Haury shows a vertical system while those of Matsushima U.S. Pat. No. 3,570,579; Deeds U.S. Pat. No. 4,313,636; Kirkham et al U.S. Pat. No. 4,518,194; Englehardt U.S. Pat. No. 4,550,945 and Romano U.S. Pat. No. 4,611,848 all show horizontally-disposed units, several of which are specifically designed for use as pickup bed covers. The Kloppe U.S. Pat. No. 4,474,405 assigned to the Ford Motor Company employs individual and separable slats; however, they raise up and move into a somewhat nested relation rather than stacking.

The closest prior art known to me is contained in my U.S. patent identified above along with the early patent to Ford U.S. Pat. No. 1,826,871. As I mentioned previously, my patented construction was one in which each of my slat-forming panels in succession left the tracks, separated itself from the one behind and pushed its way underneath the stack as forward pressure was applied to the rearmost one. My present construction is such that the slats stack one on top of another in the manner of Ford; however, here is where the similarity ends in that I provide a well for the stack and a ramp leading down into it that is not found in the prior art of which I am aware. Moreover, my slat design is quite different and each contains a deep generally V-shaped channel on its trailing edge that provides both a cam surface to assist the downturned flange on the one behind to ride up thereover into stacked relation and also this same channel constitutes a gutter capable of draining any water that enters same off to the side where the tracks are located that carry it to a drain hose before it can enter the bed.

The drain system as a whole appears to be unknown in connection with pickup bed covers although several prior art patents are known to me that relate to drain gutters for vehicles generally. Hagberg's U.S. Pat. No. 3,331,433 discloses a heated drainage system for dump trucks while the Hack U.S. Pat. No. 4,071,273 assigned to Daimler-Benz shows an analogous system for use in draining the wheel wells of passenger vehicles. Roof drainage systems for passenger vehicles form the subject matter of the U.S. Pat. No. 3,711,147 to Higuchi et al assigned to Honda of Japan and Draper's U.S. Pat. No. 4,582,358. None of the above, however, is used in association with a slatted cover for truck beds and the like.

SUMMARY OF THE INVENTION

The present invention, therefore, relates specifically to certain improvements in my previously-patented pickup bed cover that relate to the way in which the slat-forming panels stack, store, seal and drain.

It is the principal object of my invention to provide a novel and improved pickup bed cover.

A second objective is the provision of a device of the type aforementioned wherein the slat-forming panels are so designed that each is provided with a V-shaped gutter by means of which the water is carried to the tracks atop the sidepanels of the bed by each of the slats and then discharged onto the ground through suitable drains connected into these tracks.

Another object of the within-described invention is to provide the V-shaped gutters along the trailing edges of each slat-forming panel with a downwardly and rearwardly sloping wall that defines a cam surface over which the similarly shaped downturned flange of the slat therebehind rides into stacked relation.

Still another objective is to provide the storage area with a ramp down which the individual slats slide as they stack atop one another.

An additional objective is to provide a redesigned slat that cooperates with adjacent slats when in closed position to produce a more nearly contiguous surface that is far less likely to admit dirt, small stones and other debris into the gutters thereof that carry the water to the rails while, at the same time, being preferably crowned to more efficiently accomplish the drainage function.

Further objects are to provide a slidable pickup bed cover that is strong, easy to open and close, readily adaptable to various size pickup beds, one that is versatile, simple to disassemble for cleaning and complements the style and appearance of the truck on which it is used.

Other objects will be in part apparent and in part pointed out specifically hereinafter in connection with the description of the drawings that follows.

BRIEF DESCRIPTION OF THE DRAWINGS

FIG. 1 is a perspective view showing the pickup bed cover of the present invention in place and partially open, portions having been broken away to more clearly reveal the interior construction;

FIG. 2 is a fragmentary longitudinal section to a greatly enlarged scale showing how the individual slat-forming panels slide up over one another and down the ramp into stacked relation within the well;

FIG. 3 is a still further enlarged fragmentary section taken along line 3—3 of FIG. 2; and, FIG. 4 is a fragmentary section to the same scale as FIG. 3 showing the interlock between the panels.

DESCRIPTION OF THE PREFERRED EMBODIMENTS

Referring next to the drawings for a detailed description of my invention and, initially, to FIG. 1 for this purpose, reference numeral 10 has been selected to broadly designate the truck bed cover in its entirety while number 12 identifies the truck itself and 14 the open-topped bed of the latter. My cover 10 is designed specifically for use in the horizontal position shown and it is ill-suited for vertical use. For instance, as will be seen presently, the individual slat-forming panels 16 will not stack readily overhead since each is independent of the others when freed from the tracks 18 and, therefore, there is no assurance that they will link up again properly. By the same token, forming the stack at the bottom has its problems also in that the stack will interfere with access to the very opening the unit is designed to cover unless a storage well of some type is provided beneath ground level. Also, once again, as the panels become separated from the tracks 18, they are free to fall over and they may, as a result, become so disoriented that reassembling them becomes a problem. On the other hand, the unit can be used as an openable cover over any horizontally-disposed access opening provided, of course, that the tracks 18 can be mounted in spaced parallel relation to one another and there is room at one end or the other of the tracks for the ramp 20 and the storage well 22 thereabove.

Before getting into the details of the above, however, there are some preliminaries that should be attended to. The open-topped bed 14 of the pickup truck has a pair of upstanding sidepanels 24 that extend forwardly from the tailgate 26 in spaced parallel relation, terminating at the rear wall 28 of the cab 30. The storage well 22 which will be described in more detail presently lies directly behind cab wall 28 as shown most clearly in FIG. 2. A cover 32 encloses the top of storage well 22 in a manner to be described more fully later on.

Starting with the tracks 18 which are most clearly revealed in FIG. 3 to which detailed reference will now be made, each will be seen in the particular form shown to comprise what is sold under the trademark "Unistrut" they being shaped to provide an elongate generally C-shaped hollow metal beam having a main vertical web 34 bordered top and bottom by spaced parallel flanges 36T and 36B. The free inside edge of lower flange 36B is turned up and back upon itself to produce a rail 40. The upstanding smaller web 42 of this rail 40 cooperates with the main web 34 alongside thereof and the bottom flange 36B to define a gutter to catch any water draining off the ends of the slat-forming panels for the purpose of conducting it to one end or the other of the track where the drains 44F and 44R are located that can be seen in FIG. 1. On the other hand, the horizontal flange 46 of rail 40 provides a reasonably broad flat supporting surface for the trailing ends 48 of the panels to ride and slide upon as they move between their stowed and extended positions.

In order for the tracks 18 to deliver the panels one-at-a-time down the ramp 20 and into stacked relation inside the storage area 22, these rails must be mounted on the inside surfaces of the sidepanels 24 as opposed to being on top of the latter where some of the metal up front would have to be cut away. There are, of course, a multitude of ways of attaching the tracks to the sidepanels, but, one easy way is that shown wherein simple brackets 50 bridging the top of each side panel 24 and the top flange 36T of the track are fastened together by means of bolts 52. Welding is another option but the pickup owner may object to having the paint burned in the bed by the welder's torch. Also, welding results in a permanent installation, whereas, occasions may arise in which one wishes to have the option of removing the cover such as, for example, installing a camper which forms its own cover. An even better reason for not welding the rails onto the sidepanels is to enable the installer to adjust for minor misalignment of the latter by slotting the bolt holes.

Looking at FIG. 3, it will be seen that the rail-carrying portion of the tracks 18 is comprised primarily of main web 34, lower flange 36B, short upstanding flange 42 and horizontal flange 46, the latter two forming the rail 40 and all of which slope downwardly to form ramp 20 at the entrance to the storage compartment 22. The top flange 36T is eliminated at the entrance to the storage compartment since it is no longer needed. This means, of course that the individual panels 16 are free to raise up, separate from one another and move into the stacked relation shown in FIG. 2 since the only elements preventing them from leaving the rails 40 were the upper flange 36T of the track and the overlying bracket 50. As is also seen in FIG. 2, the main web 34 is notched and the notch filled in with a generally V-shaped bridge 56 to make the transition of the tracks from horizontal to downwardly and forwardly sloped. Alternatively, the Unistrut can be terminated at the entrance to the storage compartment 22 and some other U-shaped member used as a continuation of the rail provided it will support the ends of the panels and, in addition, form a gutter adapted to conduct any water forwardly and down into front drain 44F.

With specific reference to FIG. 4, it can be seen that all of the slat-forming panels 16 with the exception of one which will be described in connection with FIG. 2 presently, each comprise an elongate rectangular body section 58 terminating along the front or leading edge thereof in a downwardly and rearwardly inclined flange 60. The trailing edge of this flange 60 can be seen at 62 to be slightly rounded so as to provide a smooth surface to ride up along the upwardly and forwardly inclined cam-forming ramp 64 that extends along the rear edge of the body 58. Ramp 64 terminates at its rear end in an upturned flange 66 which cooperates therewith to define a trough-shaped gutter capable of carrying any water or other fluid falling on the body 58 to one end or the other thereof where it is discharged into the bottom of the track and drained off through one of the drains 44.

Also to be seen in FIG. 4 is the relationship between flanges 60 at the leading edge of one panel and ramp 64 at the trailing edge of the one in front. While the slope of these surfaces is not, nor is it intended to be, identical, nevertheless, they preferably diverge upwardly through a relatively small angle so as to leave a narrow gap 68 at the top that will effectively keep out most of the solid debris such as, for example, rocks, twigs and the like which otherwise would keep the panels from interlocking properly in extended position. Functionally, of course, downturned flange 60 need not slope rearwardly as shown but the better and preferred design is to have it do so. While on the subject of preferred embodiments, it is preferable to have each of the panels 16 slightly crowned so as to be somewhat higher in the middle than at the ends. To do so enables the panels to shed water a little more easily and it also has a tendency to prevent puddles from forming in the medial section of a panel should it become bent.

Next, before describing the stacking function, it will be well to return to FIG. 2 where note can be taken of the upwardly and rearwardly inclined stop 70 that defines the front wall of the storage compartment. As the panels slide down the ramp 20, the leading edges 72 thereof engage this stop thus holding each successive panel in a rearwardly-staggered position such that the trailing edges thereof are prevented from moving into a nested relationship Since the forwardmost panel 16M of the series never has to pick up another panel when moving from retracted into extended position, it does not require downturned flange 60 along its leading edge. Accordingly, in the form shown in FIG. 2, its leading edge 72M has been shown slightly modified to include an upturned stop-engaging flange 74.

To close the cover, it is only necessary for the operator to push against the rearmost panel of the series at which point its rounded edge 62 will climb up ramp 64 of the panel ahead a short distance until it raises up and strikes the overhanging flange 36T of the track whereupon all further relative movement between the two ceases. Next, the second panel from the rear does likewise with the third panel and so on until all are essentially moving forward together. Very quickly in this process, however, one of the front panels will start to descend ramp 20 leaving the leading edge of the panel therebehind free to ride up on the ramp 64 upon which it rests thus moving the second panel into a superimposed position above the first. The panel behind cannot, however, move all the way forward into the front of the storage compartment because the inclined stop 70 prevents it from doing so thus leaving the stack in a rearwardly-staggered relation in which an upper panel cannot nest in the gutter of the panel underneath. Note that panel 16M, while always on the bottom and the first to descend the ramp, may never leave the storage compartment depending upon how many panels are being used to cover the bed. By having the panels descend the ramp one-at-a-time from the front and stack atop one another, it becomes a very easy operation to perform in contrast to my earlier unit in which it was necessary to push each successive panel underneath the stack.

Closing the cover, of course, entails merely reversing the above procedure. As each panel in turn is pulled from the storage compartment 22, the downturned flange 60 on its leading edge will drop into the trough formed in the trailing edge of the next panel in line and pull it up the ramp and into the tracks. This process is repeated until the first of the panels to leave the storage compartment reaches the rear end of the tracks. A stop (not shown) in the form of a plug preferably is used to close the rear end of each track and thus limit the excursion of the cover into its extended position. Other types of stops well known in the art can also be used to perform this function as can the tailgate itself, however, some sort of essentially waterproof seal should be made at both ends of the rail so as to prevent the escape of water collected therein except through the drains 44 provided for this purpose. At the front of the storage compartment 22, downturned flange 78 (FIG. 2) bolted to the rear wall 28 of the cab functions to plug the front end of the tracks. A rearwardly-extending flange 80 screwed or otherwise attached to the underside of the overhanging brackets 50 completes the installation of the stop.

Now, to remove the panels for cleaning, etc., a pair of transversely-spaced notches 82 are provided in the inside edges of brackets 50 underneath the storage compartment cover 32 which is only accessible with the latter taken off. The storage compartment cover 32 is shown bolted to the brackets 50 but, here again, other fastening means can be used so long as they can be removed to gain access to the storage compartment including, for example, such things as a lockable hinged hatch cover of some description. Once removed, the panels 16 can be withdrawn one-at-a-time through slots 80 as indicated by phantom lines in FIG. 2.

The drainage system, apart from the transversely-extending troughs in the panels and the gutters receiving the water therefrom formed in the bottom of the tracks, is relatively simple. The rear drains seen in FIG. 3 include ordinary flanged collars 82 mounted within holes 84 in the bottom fflanges 36B of the rails near their rear ends. A hose 86 carries the water collected in the rail gutters out through holes 88 in the sidepanels and down onto the ground. Drains 44F at the front end of the storage compartment 22 are not much different in that they include similar flanged collars 82 mounted within holes 90 in the front lowermost point of the rails to which is attached a drain hose 92. A drain hole (not shown) in the bottom of the pickup bed will accept the hose and deliver the water to the ground. It is unnecessary that the bottom of the storage compartment be covered as the rails alone will carry the water to the drains.

Referring once more to FIG. 1, it will be seen that the rearmost slat-forming panel 16 carries, in the particular form shown, a tailgate hood 94 which is hingedly attached at 96 along its leading edge to the rear edge of the panel. This hood is designed to extend across the top of the tailgate 26 when the cover 10 is fully extended. A hasp 98 can be used in conjunction with lock 100 to secure the cover and also prevent the tailgate from being opened.

What is claimed is:

1. The telescopable cover for horizontally disposed generally rectangular access openings and the like bordered by upstanding walls on at least two sides thereof which comprises: a pair of rigid elongate generally channel-shaped tracks mountable on opposite sides of the access opening extending fore and aft in transversely-spaced parallel relation with the channels therein opening toward one another, each of said tracks including upper and lower rail-forming surfaces separated by a longitudinally-extending slot; means defining downwardly and forwardly-sloping continuations of said lower rail-forming surfaces located at the front end of each track; a plurality of transversely elongate rectangular slat-forming panels bridging the space between the tracks with the opposite ends thereof located within the slots for longitudinal slidable movement along the lower of the rail-forming surfaces, the trailing edge of each panel having a downwardly and rearwardly sloping cam surface terminating in an upstanding flange, the leading edge of at least all but the forwardmost panel terminating in a downturned flange, the downturned flanges of each trailing panel being shaped and adapted to hook in front of the upturned flange on the trailing edge of the lead panel immediately ahead so as to produce an interlocking chain thereof, the downturned flange of each of the trailing panels also being adapted upon forward longitudinal movement thereof relative to the downwardly and rearwardly-sloping cam surface of the lead panel immediately ahead thereof to ride up thereupon and raise the leading edge of said trailing panel so as to wedge same against the upper rail-forming surfaces of the tracks whereby said panels thus interlocked will move forward as a unit, and said cam surface further cooperating with the downturned flange of the panel therebehind to unhook and elevate the leading edge of the latter while simultaneously raising same into a superimposed stacked relation atop said lead panel as each panel in turn leaves the track and descends the ramp defined by the downwardly and forwardly-sloping continuations of the lower rail-forming surfaces, and said downturned flange of each superimposed panel in the stack being adapted to slide rearwardly along the cam surface of the panel therebeneath and into interlocked engagement with the upturned flange of the latter upon rearward movement of said superimposed panel, and said interlocking flanges cooperating to form the panels into a chain thereof positioned to reenter the opposed slots in the tracks as they ascend said ramp.

2. The telescopable access opening cover as set forth in claim 1 in which: the channel-shaped tracks and ramp at the forward end thereof each include an upwardly-extending web and a laterally-extending lower flange cooperating with one another and with the lower of the rail-forming surfaces to define a continuous gutter adapted to receive water and deliver same to one end or the other thereof; the downwardly and rearwardly-sloping cam surfaces and upturned flanges on the trailing edges of the panels cooperate to define troughs adapted to catch water deposited thereon from above and deliver same to one or the other of the gutters; plug-forming means blocking the ends of the gutters; and, in which a hole is provided in the lower flange of each gutter adjacent at least one of the plugged ends thereof for draining water therefrom.

3. The telescopable access opening cover as set forth in claim 1 in which: the downturned flanges on the leading edges of the panels slope downwardly and rearwardly at an angle just slightly greater than the slope of the cam surfaces of the adjacent panel atop which they ride so as to leave a relatively narrow gap therebetween.

4. The telescopable access opening cover as set forth in claim 1 in which: the lower rail-forming surface is comprised of an upstanding web terminating in spaced relationship beneath the upper rail-forming surface and a horizontally disposed flange atop said web.

5. The telescopable access opening cover as set forth in claim 1 in which: a removable coverplate covers the ramp in spaced relation thereabove, said coverplate and ramp cooperating with one another and with the adjacent walls to define a storage compartment for the stacked panels.

6. The telescopable access opening cover as set forth in claim 1 in which: an upwardly and rearwardly inclined stop-forming means extends from the lower end of the ramp in acute angular relation to the latter, said stop-forming means being positioned and adapted to engage the leading edges of each panel as it is stacked so as to hold same in staggered relation behind the panel therebeneath a distance adapted to prevent the panels from nesting.

7. The telescopable access opening cover as set forth in claim 2 in which: the panels are crowned so as to shed water to the ends thereof.

8. The telescopable access opening cover as set forth in claim 5 in which: means comprising horizontally-disposed continuations of the upper rail-forming means extend forwardly from the front end of the tracks in supporting relation beneath the coverplate; and, in which said upper rail-forming means continuations are notched beneath said coverplate to permit removal of the panels.

9. The telescopable cover for horizontally disposed generally rectangular access openings and the like which comprises: a pair of rigid elongate generally channel-shaped tracks mountable on opposite sides of the access opening in transversely-spaced parallel relation, each of said tracks including a an upwardly-extending web, upper and lower laterally-extending flanges depending from the web in vertically-spaced relation to one another and an upstanding rail-forming flange depending from said lower flange cooperating with the latter and with said web to define an upwardly-opening generally channel-shaped gutter, said rail-forming flanges of the two tracks being so located relative to one another so as to cooperate with their respective upper flanges to define longitudingally-extending slots therebetween opening toward one another; means defining a downwardly and forwardly sloping continuation of said rail-forming gutters; a plurality of transversely-elongate rectangular slat-forming panels bridging the space between the tracks with the opposite ends thereof located and confined within the slots for longitudinal slidable movement along the rail-forming flanges in substantially right angular relation to the latter, the trailing edge of each panel being shaped to provide a downwardly and rearwardly-sloping cam surface terminating in an upstanding flange cooperating with said cam surface to define an upwardly-facing transversely-extending trough adapted to receive fluids from above and deliver same to the gutters in the bottom of the tracks alongside thereof, and at least some of said panels having the leading edges thereof shaped to provide a downturned flange, the downturned flanges of each trailing panel being shaped and adapted to hook in front of the upturned flange on the trailing edge of the lead panel immediately ahead thereof to define an interlocking chain thereof, the downturned flange of each of the trailing panels being adapted upon forward longitudinal movement thereof relative to the downwardly and rearwardly-sloping cam surface of the lead panel immediately ahead thereof to raise the leading edge of said trailing panel and wedge same against the upper flanges of the tracks while confined therebeneath so that said panels move ahead together as a unit, said cam surface also cooperating with the downturned flange of the panel therebehind to unhook and elevate the leading edge of the latter while simultaneously raising same into a superimposed stacked relation atop said lead panel as each panel in turn leaves the tracks and descends the ramp defined by the downwardly and forwardly-sloping continuations of the gutter-forming rails, and said downturned flange of each superimposed panel in the stack being adapted to slide rearwardly along the cam surface of the panel therebeneath and into interlocked engagement with the upturned flange of the latter upon rearward relative movement of said superimposed panel, said interlocking flanges cooperating to form the panels into a chain thereof positioned to reenter the opposed slots in the tracks; means plugging the ends of the gutter-forming rails; and, at least one opening in an end of each rail adjacent said plug-forming means positioned and adapted to drain water therefrom.

* * * * *